United States Patent
Williams et al.

(10) Patent No.: US 12,355,373 B2
(45) Date of Patent: Jul. 8, 2025

(54) WIRELESS TRANSMITTER

(71) Applicant: SCHNEIDER ELECTRIC ASIA PTE LTD, Singapore (SG)

(72) Inventors: Mathew Adam Williams, Singapore (SG); Aurelien Albert Francois Franc, Singapore (SG); Jordan Xu, Singapore (SG); Caijin Wang, Singapore (SG); Benjamin Plessis, Singapore (SG); Qifei Gao, Singapore (SG)

(73) Assignee: SCHNEIDER ELECTRIC ASIA PTE LTD, Singapore (SG)

( * ) Notice: Subject to any disclaimer, the term of this patent is extended or adjusted under 35 U.S.C. 154(b) by 57 days.

(21) Appl. No.: 18/256,462

(22) PCT Filed: Jun. 2, 2021

(86) PCT No.: PCT/SG2021/050312
§ 371 (c)(1),
(2) Date: Jun. 8, 2023

(87) PCT Pub. No.: WO2022/255934
PCT Pub. Date: Dec. 8, 2022

(65) Prior Publication Data
US 2024/0223110 A1 Jul. 4, 2024

(51) Int. Cl.
*H01H 3/42* (2006.01)
*H01H 71/02* (2006.01)
(Continued)

(52) U.S. Cl.
CPC ........... *H02N 11/002* (2013.01); *G08C 17/02* (2013.01); *H01H 3/42* (2013.01)

(58) Field of Classification Search
CPC ... H01H 71/0271; H01H 2300/03; H01H 3/42
See application file for complete search history.

(56) References Cited

U.S. PATENT DOCUMENTS

2015/0364278 A1* 12/2015 Morioka ............ H01H 13/7006
200/341
2019/0097512 A1* 3/2019 Liu ...................... H02K 7/1876
(Continued)

FOREIGN PATENT DOCUMENTS

CN 211907296 U 11/2020
EP 1054424 A1 11/2000
(Continued)

OTHER PUBLICATIONS

Japanese Office Action dated Feb. 18, 2025 for Japanese Patent Application No. 2023-512404.
(Continued)

*Primary Examiner* — Timothy J Thompson
*Assistant Examiner* — Amol H Patel
(74) *Attorney, Agent, or Firm* — EIP US LLP

(57) ABSTRACT

A wireless transmitter for coupling to an actuation device and a method of producing a wireless transmitter are provided. The transmitter comprises a transmitter housing having a first top surface; a translational member located at the first top surface of the transmitter housing; a cam member located within the transmitter housing, the cam member arranged for rotation about a fixed point of the cam member, the cam member comprising a contact component for contacting the translational member, the cam member further comprising a member body extending between the contact component and the fixed point of the cam member; a power generator located within the transmitter housing for generating power to operate the transmitter; wherein the translational member is arranged to translate towards the cam member and to contact the contact component of the cam member on application of a mechanical force; and wherein the cam member is arranged to rotate about the fixed point such that the contact component is capable of rotating (Continued)

towards the power generator to activate the power generator, the rotating being upon contact of the translational member with the contact component of the cam member.

18 Claims, 10 Drawing Sheets

(51) Int. Cl.
*H02N 11/00* (2006.01)
*G08C 17/02* (2006.01)

(56) References Cited

U.S. PATENT DOCUMENTS

| | | |
|---|---|---|
| 2020/0035089 A1 | 1/2020 | Liu |
| 2023/0115904 A1* | 4/2023 | Williams ............... H01H 9/161 200/314 |

FOREIGN PATENT DOCUMENTS

| | | |
|---|---|---|
| EP | 2180495 A1 | 4/2020 |
| JP | 2013536553 A | 9/2013 |
| JP | 2016003492 A | 1/2016 |
| JP | 2016163167 A | 9/2016 |
| JP | 2017526212 A | 9/2017 |
| JP | 2017184214 A | 10/2017 |

OTHER PUBLICATIONS

International Search Report dated Sep. 17, 2021 for PCT Application No. PCT/SG2021/050312.

* cited by examiner

United States Patent US 12,355,373 B2

WIRELESS TRANSMITTER

CROSS-REFERENCE TO RELATED APPLICATIONS

This application is a 371 National Phase of International Application No. PCT/SG2021/050312, filed Jun. 2, 2021. The above-referenced patent application is incorporated by reference in its entirety.

TECHNICAL FIELD

The present disclosure relates broadly to a wireless transmitter for coupling to an actuation device.

BACKGROUND

Under current technology, to control devices/machinery in industrial settings, transmitters may be used to work with either wired or wireless systems to transmit communication signals to receivers at the devices/machinery.

For a wired transmitter which is coupled to an actuation device such as a pushbutton, the actuation device may only control or actuates the devices/machinery that are wired/coupled to the wired transmitter. That is, the wired transmitter cannot control or actuate other devices which are not wired/coupled to the wired transmitter. Another problem that arises with wired transmitters is that the wired transmitter can only remain fixed to an initially determined position after wiring is performed. This may lead to inflexibility during/after the initial phase of setting up a system or network for industrial units or its modification phase.

Therefore, for certain applications/systems, wireless transmitters are provided. For such wireless transmitters, power has to be provided to the transmission mechanism inside the transmitters for transmitting signals to a corresponding receiver. This may lead to a wireless transmitter having a large form factor such that only one wireless transmitter may be connected or coupled to one actuation device. Therefore, currently, it is recognized that only one actuation device can be associated with one wireless transmitter. This limits the actuation device to communicate with the receiver associated with the wireless transmitter, i.e. limited in its remote control function.

Furthermore, for such wireless transmitters, the actuation devices are manufactured with a one-to-one relationship with the transmitters. That is, each actuation device may work or may couple/mate with only a dedicated or specific wireless transmitter. This may lead to an increase in costs and complexity in logistics since a high number of different customized actuation devices have to be procured for different types or models of transmitters.

Hence, in view of the above, there exists a need for a wireless transmitter and a method of producing a wireless transmitter that seek to address at least one of the above problems.

SUMMARY

In accordance with an aspect of the present disclosure, there is provided a wireless transmitter for coupling to an actuation device, the transmitter comprising a transmitter housing having a first top surface; a translational member located at the first top surface of the transmitter housing; a cam member located within the transmitter housing, the cam member arranged for rotation about a fixed point of the cam member, the cam member comprising a contact component for contacting the translational member, the cam member further comprising a member body extending between the contact component and the fixed point of the cam member; a power generator located within the transmitter housing for generating power to operate the transmitter; wherein the translational member is arranged to translate towards the cam member and to contact the contact component of the cam member on application of a mechanical force; and wherein the cam member is arranged to rotate about the fixed point such that the contact component is capable of rotating towards the power generator to activate the power generator, the rotating being upon contact of the translational member with the contact component of the cam member.

The contact component of the cam member may comprise a projecting end angled towards the translational member for contacting the translational member and a heel portion distal to the projecting end of the cam member, the heel portion being arranged to be displaced towards a generating mechanism of the power generator.

Upon the contact component rotating towards the power generator, an increasing surface area of the heel portion may contact the generating mechanism of the power generator to increasingly displace the generating mechanism of the power generator to generate the power to operate the transmitter.

At least one electrically conductive member may be disposed on at least one side wall of the housing, the at least one electrically conductive member arranged to allow electrical coupling to another device disposed adjacent to the wireless transmitter.

A transmission mechanism may be disposed on a circuit board, the circuit board disposed in a vertical orientation extending between the first top surface and an opposing second bottom surface of the housing.

The transmission mechanism may be capable of transmitting a communication signal upon generation of power by the power generator.

A first mechanical mating member may be disposed at the first top surface wherein the first mechanical mating member is adapted to mechanically engage with an external actuation device disposed at the first top surface.

A second mechanical mating member may be disposed at a back end of the housing wherein the second mechanical mating member is adapted to mechanically couple with an external device disposed adjacent to the wireless transmitter.

In accordance with another aspect of the present disclosure, there is provided a method of producing a wireless transmitter, the method comprising providing a transmitter housing having a first top surface; disposing a translational member at the first top surface of the transmitter housing; disposing a cam member within the transmitter housing, the cam member arranged for rotation about a fixed point of the cam member, the cam member comprising a contact component for contacting the translational member, the cam member further comprising a member body extending between the contact component and the fixed point of the cam member; disposing a power generator within the transmitter housing for generating power to operate the transmitter; further arranging the translational member to translate towards the cam member and to contact the contact component of the cam member on application of a mechanical force; and further arranging the cam member to rotate about the fixed point to rotate the contact component towards the power generator to activate the power generator, the rotation capable of happening upon contact of the translational member with the contact component of the cam member.

The contact component of the cam member may comprise a projecting end angled towards the translational member for contacting the translational member and a heel portion distal to the projecting end of the cam member, the method may further comprise arranging the heel portion to be displaced towards a generating mechanism of the power generator.

The method may further comprise arranging the cam member such that upon the contact component rotating towards the power generator, an increasing surface area of the heel portion is capable of contacting the generating mechanism of the power generator to increasingly displace the generating mechanism of the power generator to generate the power to operate the transmitter.

The method may further comprise disposing at least one electrically conductive member on at least one side wall of the housing, the at least one electrically conductive member arranged to allow electrical coupling to another device disposed adjacent to the wireless transmitter.

The method may further comprise disposing a transmission mechanism on a circuit board, and disposing the circuit board in a vertical orientation extending between the first top surface and an opposing second bottom surface of the housing.

The transmission mechanism may be capable of transmitting a communication signal upon generation of power by the power generator.

The method may further comprise disposing a first mechanical mating member at the first top surface and adapting the first mechanical mating member to mechanically engage with an external actuation device disposed at the first top surface.

The method may further comprise disposing a second mechanical mating member at a back end of the housing and adapting the second mechanical mating member to mechanically couple with an external device disposed adjacent to the wireless transmitter.

BRIEF DESCRIPTION OF THE DRAWINGS

Exemplary embodiments of the present disclosure will be better understood and readily apparent to one of ordinary skill in the art from the following written description, by way of example only, and in conjunction with the drawings, in which:

FIG. 1A is a perspective view of a wireless transmitter in an exemplary embodiment.

DETAILED DESCRIPTION

Figure 1B:
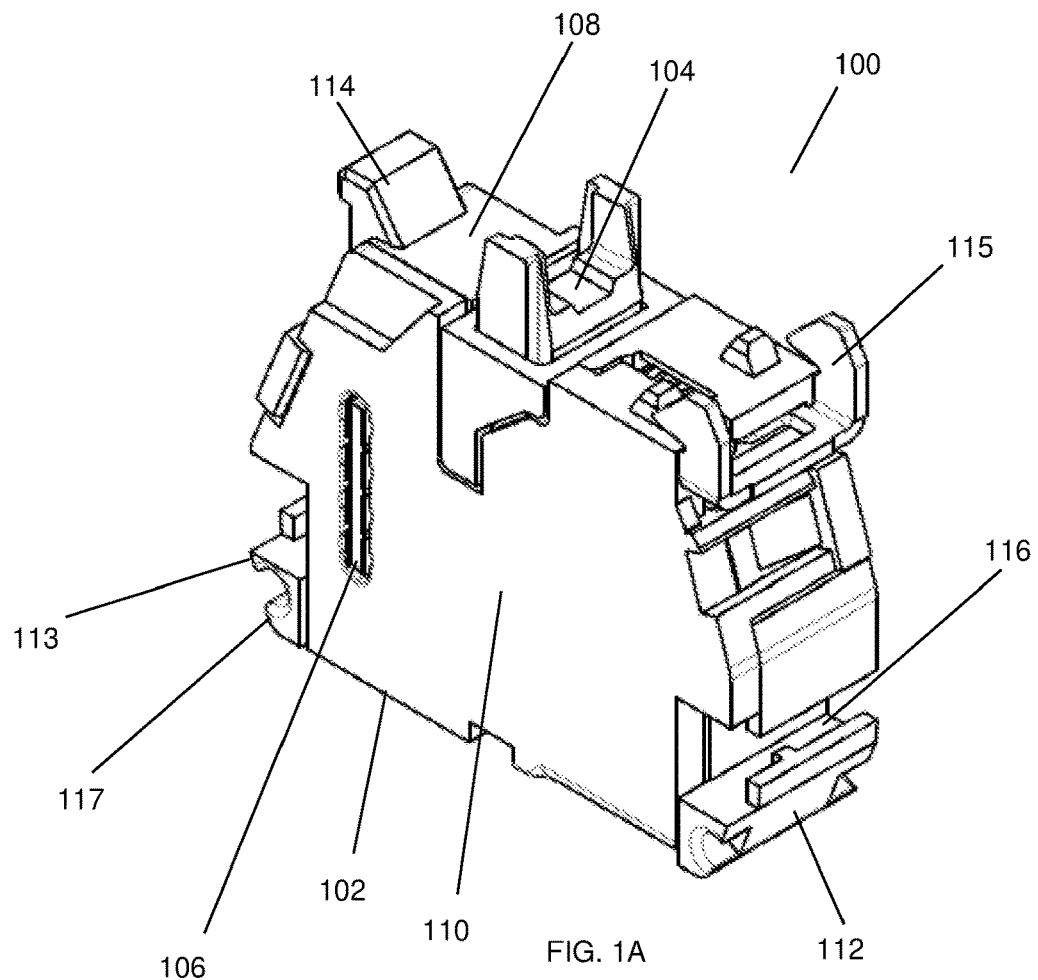
FIG. 1B is a perspective view showing external exemplary dimensions of the wireless transmitter of FIG. 1A.
Figure 1B:
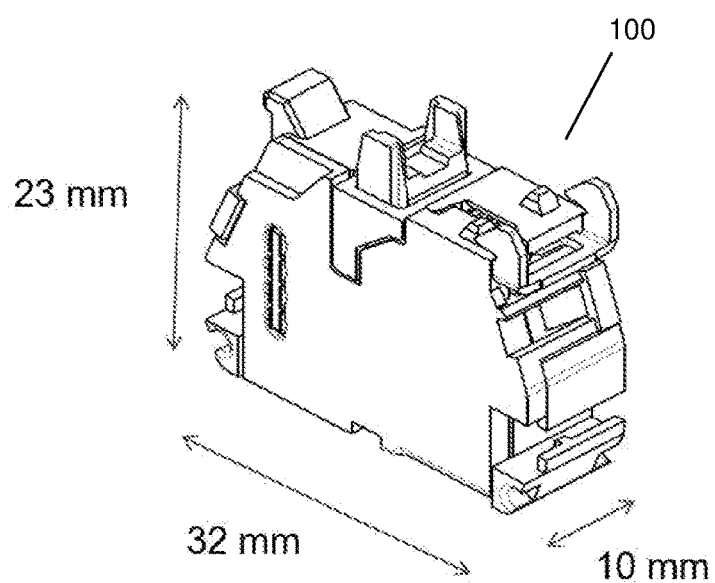

FIG. 1A is a perspective view of a wireless transmitter in an exemplary embodiment. FIG. 1B is a perspective view showing external exemplary dimensions of the wireless transmitter of FIG. 1A.

In the exemplary embodiment as shown in FIG. 1A, the wireless transmitter 100 comprises a transmitter housing 102, a translational member 104, a cam member (not shown), a power generator (not shown). The wireless transmitter 100 may additionally comprise an electrically conductive member 106.

The transmitter housing 102 comprises a first top surface 108, a first side wall 110, a second side wall (not shown), a first back end 112 and a second back end 113. The first side wall 110 is opposite the second side wall (not shown). The first back end 112 is opposite the second back end 113. The translational member 104 is located at the first top surface 108 of the transmitter housing 102. An exposed portion of the translational member 104 protrudes above the first top surface 108 of the transmitter housing 102. The cam member (not shown) is located within the transmitter housing 102. The power generator (not shown) is located within the transmitter housing 102. In the exemplary embodiment, the power generator is capable of generating power to operate the wireless transmitter 100. In the exemplary embodiment, the exposed portion of the translational member 104 protruding above the first top surface 108 is arranged to be contacted by an actuator of an actuator device. For example, such an actuator may be a plunger and the actuation device may be a pushbutton or selector switch comprising the plunger.

The wireless transmitter 100 further comprises a first mechanical mating member 114, 115 disposed at the first top surface 108. The first mechanical mating member 114, 115 is adapted to mechanically engage with or couple to an external actuation device (not shown). The first mechanical mating member 114, 115 is in the form of, but is not limited to, a fixing hook and snap-clip respectively for mounting the wireless transmitter 100 to the external actuation device. The external actuation device may be, but is not limited to, a pushbutton, a selector switch, a joy stick etc. The pushbutton, the selector switch, the joy stick etc. may be made of plastic or metal but is not limited as such. For example, the external actuation device may also be a wired transmitter with a plunger for actuating the wireless transmitter. In such a scenario, the wired transmitter may be actuated by another actuation device that in turn actuates its plunger to actuate the wireless transmitter. The first mechanical mating member 114, 115 enables the wireless transmitter 100 to be easily mounted to or dismounted from the external actuation device when disposed at the first top surface 108.

In the exemplary embodiment, the wireless transmitter 100 may further comprise a second mechanical mating member 116 disposed at the first back end 112. It may be provided that another second mechanical mating member 117 is disposed at the second back end 113 of the transmitter housing 102. The second mechanical mating member 116, 117 forms a thoroughfare extending from the first side wall 110 to the opposing second side wall (not shown). The second mechanical mating member 116, 117 is adapted to mechanically couple to an adjacent external device (not shown) disposed adjacent to the wireless transmitter 100, i.e. adjacent to the first side wall 110 and/or the second side wall of the transmitter housing 102, wherein the adjacent external device (not shown) comprises a complementary member for mating with the second mechanical mating member 116, 117.

In exemplary embodiments whereby the wireless transmitter 100 comprises the electrically conductive member 106, the electrically conductive member 106 is disposed on the first side wall 110. In some exemplary embodiments, an additional electrically conductive member e.g. 106 may be disposed on the second side wall (not shown) of the transmitter housing 102. In such exemplary embodiments, the electrically conductive member 106 is provided exposed on the respective side wall, i.e. the first side wall 110 and/or the second side wall, of the transmitter housing 102. The electrically conductive member 106 is in the form of, but is not limited to, a gold metal plated edge, one or more contact pad or one or more pogo pins. The electrically conductive member 106 allows electrical coupling of the wireless transmitter 100 to another device disposed adjacent to the wireless transmitter 100 at the first side wall 110 and/or the second side wall (not shown). For example, the another device may comprise a corresponding electrically conductive member to co-operate with the electrically conductive member 106. As an example, the electrically conductive member 106 may be one or more exposed contact pads while the another device may comprise one or more pogo pins to co-operate with the contact pads. For example, the another device can allow an external power source to be provided to the wireless transmitter via the electrical coupling. For example, sufficient power may be provided via the electrical coupling to allow the wireless transmitter to receive an acknowledgement communication signal from a receiver. For example, the wireless transmitter may control the another device via the electrical coupling.

In FIG. 1B, the external exemplary dimensions of the wireless transmitter 100 of FIG. 1A are shown. The dimensions are shown so as to provide a distinct contrast in the small form factor of the wireless transmitter of the exemplary embodiment to prior art wireless transmitters in the same field. A height of the transmitter housing 102 from the first top surface 108 to a second bottom surface (not shown) is shown as, but is not limited to, about 23 to 24 mm. The height does not take into account the height of the exposed portion of the translational member 104 protruding above the first top surface 108 which is about 5 mm.

A width of the transmitter housing 102 from the first side wall 110 to the opposing second side wall (not shown) is shown as, but is not limited to, about 10 mm. The second mechanical mating member 116 extends from the first side wall 110 along the entire width of the transmitter housing 102 to the opposing second side wall (not shown).

A length of the transmitter housing 102 from the first back end 112 to the opposing second back end 113 is shown as, but is not limited to, about 32 mm. The length includes the furthest leading edges of the second mechanical mating member 116, 117 of the exemplary embodiment.

Figure 2A:
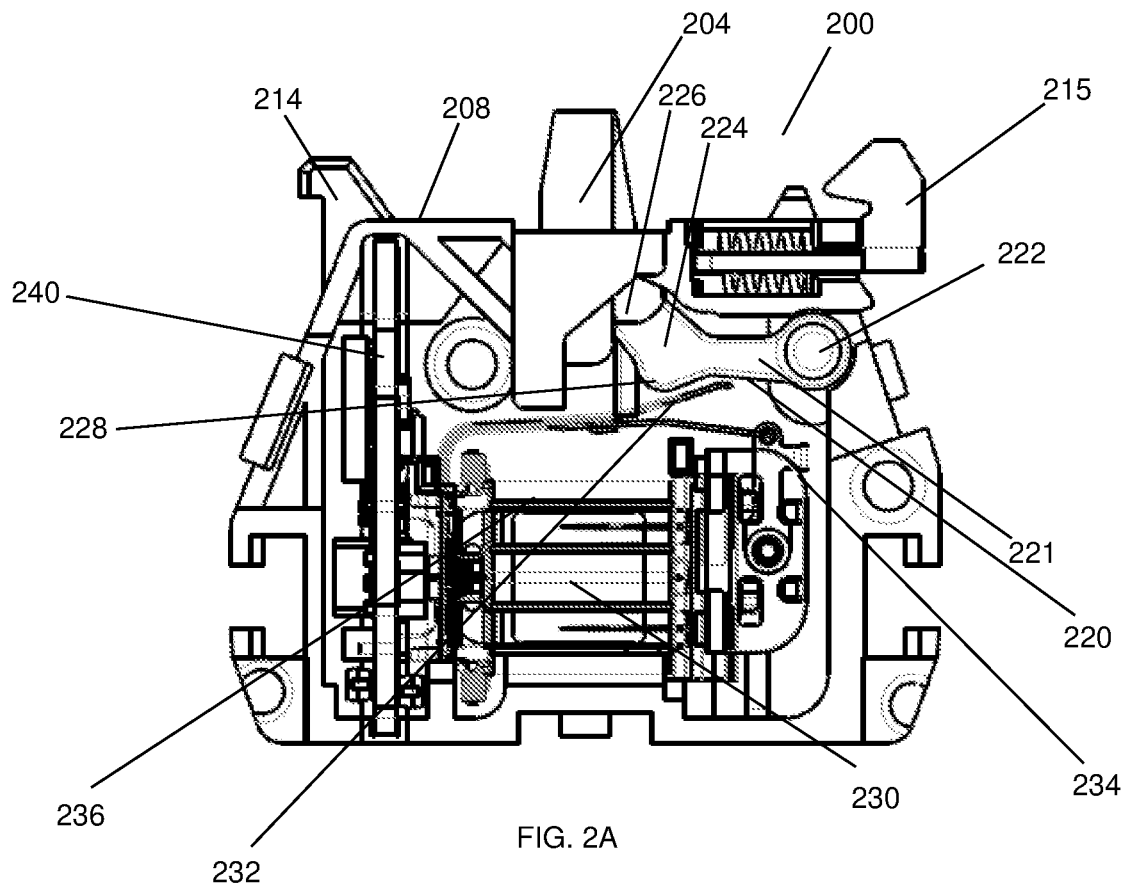
FIG. 2A is a cross-sectional side view of a wireless transmitter in an exemplary embodiment.
Figure 2B:
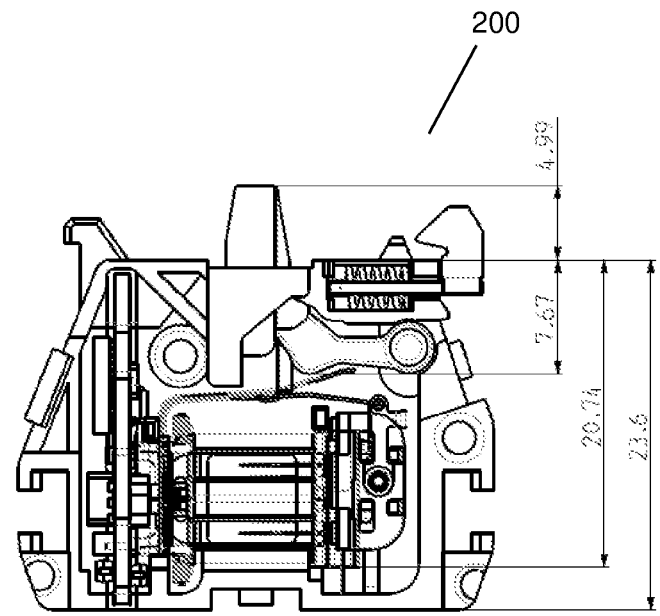
FIG. 2B is a cross-sectional side view showing exemplary dimensions of the wireless transmitter of FIG. 2A.
Figure 2C:
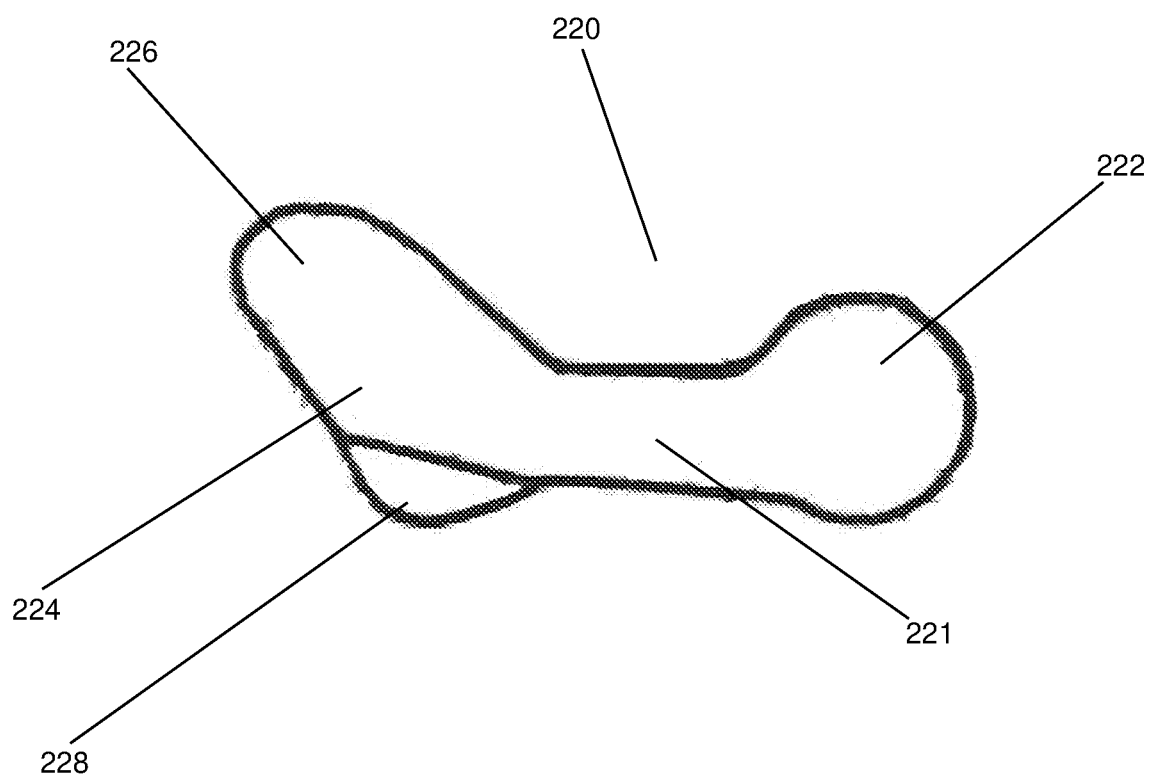
FIG. 2C is a schematic enlarged front view of a cam member of the wireless transmitter in the exemplary embodiment.

FIG. 2A is a cross-sectional side view of a wireless transmitter in an exemplary embodiment. FIG. 2B is a cross-sectional side view showing exemplary dimensions of the wireless transmitter of FIG. 2A. FIG. 2C is a schematic enlarged front view of a cam member of the wireless transmitter in the exemplary embodiment.

In the exemplary embodiment, the wireless transmitter 200 is substantially similar to the wireless transmitter 100 of FIGS. 1A and 1B. The wireless transmitter 200 comprises a translational member 204, a cam member 220, a power generator 230 and a circuit board 240. The wireless transmitter 200 may be actuated via an actuator of an external actuation device (not shown).

The translational member 204 is located at a first top surface 208 of a transmitter housing of the wireless transmitter 200 and extends into the transmitter housing. The cam member 220, the power generator 230 and the circuit board 240 are located within the transmitter housing. The translational member 204 is arranged to translate with respect to the first top surface 208 of the transmitter 204 towards the cam member 220 upon application of a mechanical force on one end of the translational member 204. The mechanical force may be applied at the exposed portion/end of the translational member 204 via the external actuation device (not shown) which may be mechanically engaged with a first mechanical mating member 214, 215 of the wireless transmitter 200.

The power generator 230 may be of any form and type that comprises a generating mechanism that can co-operate with the cam member 220 to generate power to operate the wireless transmitter 200. For example, power/energy may be generated that is sufficient for the wireless transmitter 200 to send a communication signal using the transmission mechanism (not shown) to a receiver. In the exemplary embodiment, the power generator 230 is a mechanical generator which generates energy using the inductive principle. The power generator 230 comprises a generating mechanism in the form of a spring 232. The power generator 230 further comprises a magnet 234 coupled to the spring 232 and an electromagnetic coil 236. The magnet 234 is movable in the same translational direction as the translational member 204 when the spring 232 is compressed. The magnet 234 moves with respect to the electromagnetic coil 236. The spring 232 toggles the magnet 234 to move when the spring 232 goes beyond a maximal point of compression. The toggling of the magnet 234 and movement of the magnet 234 with respect to the electromagnetic coil 236 generates a current to the circuit board 240. The generated current switches on or powers on a microcontroller of the circuit board 240 to transmit a communication signal using the transmission mechanism (not shown) to a receiver.

In the exemplary embodiment, the circuit board 240 is disposed along the height of the wireless transmitter 200 in a vertical orientation that is extending between the first top surface 208 and an opposing second bottom surface of the transmitter housing. The circuit board 240 comprises an all-in-one communication module which is used to control the circuitry and at least the sending of communication signals. The circuit board 240 comprises the microcontroller, the transmission mechanism and communication tuning components disposed on the circuit board 240. The transmission mechanism includes an antenna. The transmission mechanism is capable of transmitting a communication signal to a receiver upon generation of power by the power generator 230.

In the exemplary embodiment, the cam member 220 is provided such that properties of a cam system are used in the wireless transmitter 200. That is, an off-centre rotation of a cam member can translate a displacement of the cam member into a larger and increasing displacement of a receiving component (compare spring 232). It is appreciated that any form of a cam member may be usable.

In the exemplary embodiment, the cam member 220 is fixed at a fixed point 222 in the transmitter housing. In this exemplary embodiment, the point of rotation of the cam member 220 is at the fixed point 222 of the cam member 220. That is, the cam member 220 is arranged for off-centre rotation about the fixed point 222 of the cam member 220.

With reference to FIG. 2O, the cam member 220 of the exemplary embodiment comprises a contact component 224 for contacting the translational member 204. The cam member 220 also comprises a member body 221. The member body 221 extends between the contact component 224 and the fixed point 222. The fixed point 222 of the cam member 220 is therefore connected to the contact component 224 by the member body 221. The cam member 220 is adapted to rotate off-centre of the member body 221 about the fixed point 222. Thus, the contact component 224 is at a distal end from the fixed point 222 of the cam member 220.

In the exemplary embodiment, the contact component 224 comprises a projecting end 226 and a heel portion 228. The cam member 220 is shaped such that the projecting end 226 is angled towards the translational member 204. The heel portion 228 is distal to the projecting end 226. The heel portion 228 is disposed above the spring 232 of the power generator 230, and is arranged to be displaced towards the spring 232.

The contact component 224 is capable of making contact with the translational member 204, e.g. on application of a mechanical force on one end of the translational member 204, at a rotating end of the cam member 220 via the projecting end 226 and is capable of making contact with the spring 232 of the power generator 230 at the heel portion 228. The cam member 220 is able to rotate about the fixed point 222 such that the contact component 224 is capable of rotating towards the power generator 230 to activate the power generator 230, such rotation being upon contact of the translational member 204 with the contact component 224 of the cam member 220.

Referring to FIG. 2B, some internal exemplary dimensions of the wireless transmitter 200 of FIG. 2A are shown. The dimensions are shown so as to provide a distinct contrast in the small form factor of the wireless transmitter of the exemplary embodiment to prior art wireless transmitters in the same field. A height of the transmitter housing from the first top surface 208 to the second bottom surface is shown as, but is not limited to, about 23.6 mm. A height of the exposed portion of the translational member 204 protruding above and beyond the first top surface 208 of the transmitter housing is shown as, but is not limited to, about 4.99 mm. In an unactuated state (i.e. the translational member 204 not being moved by an external actuation device), the distance from the bottommost part of the heel portion 228 to the first top surface 208 of the transmitter housing is shown as, but is not limited to, about 7.67 mm. In the unactuated state, the distance from the bottommost part of the power generator 230 to the first top surface 208 of the transmitter housing is shown as, but is not limited to, about 20.74 mm.

Figure 3A:
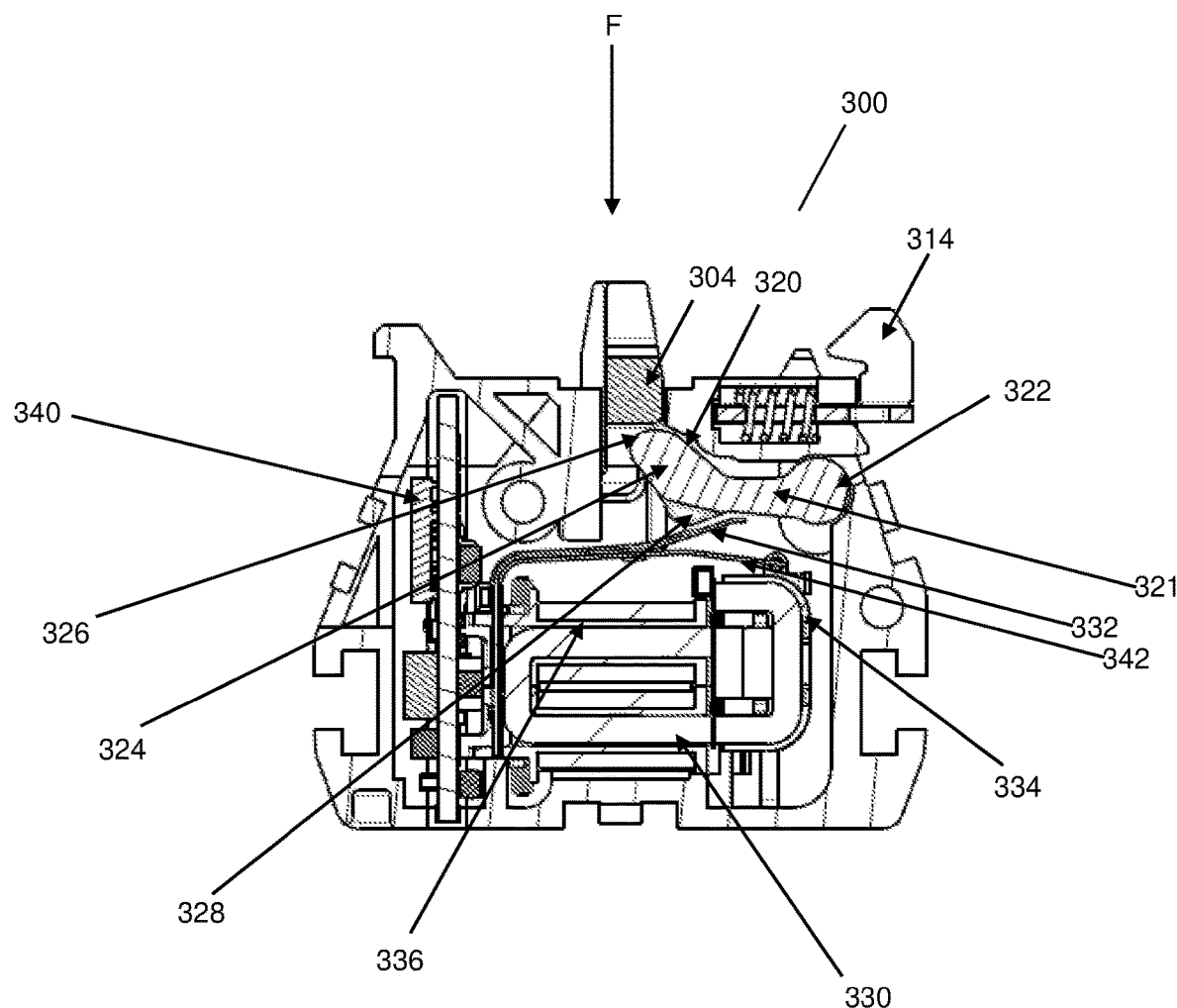
FIG. 3A is a schematic drawing for illustrating the respective positions of the various components of a wireless transmitter in an initial first position in an exemplary embodiment.
Figure 3B:
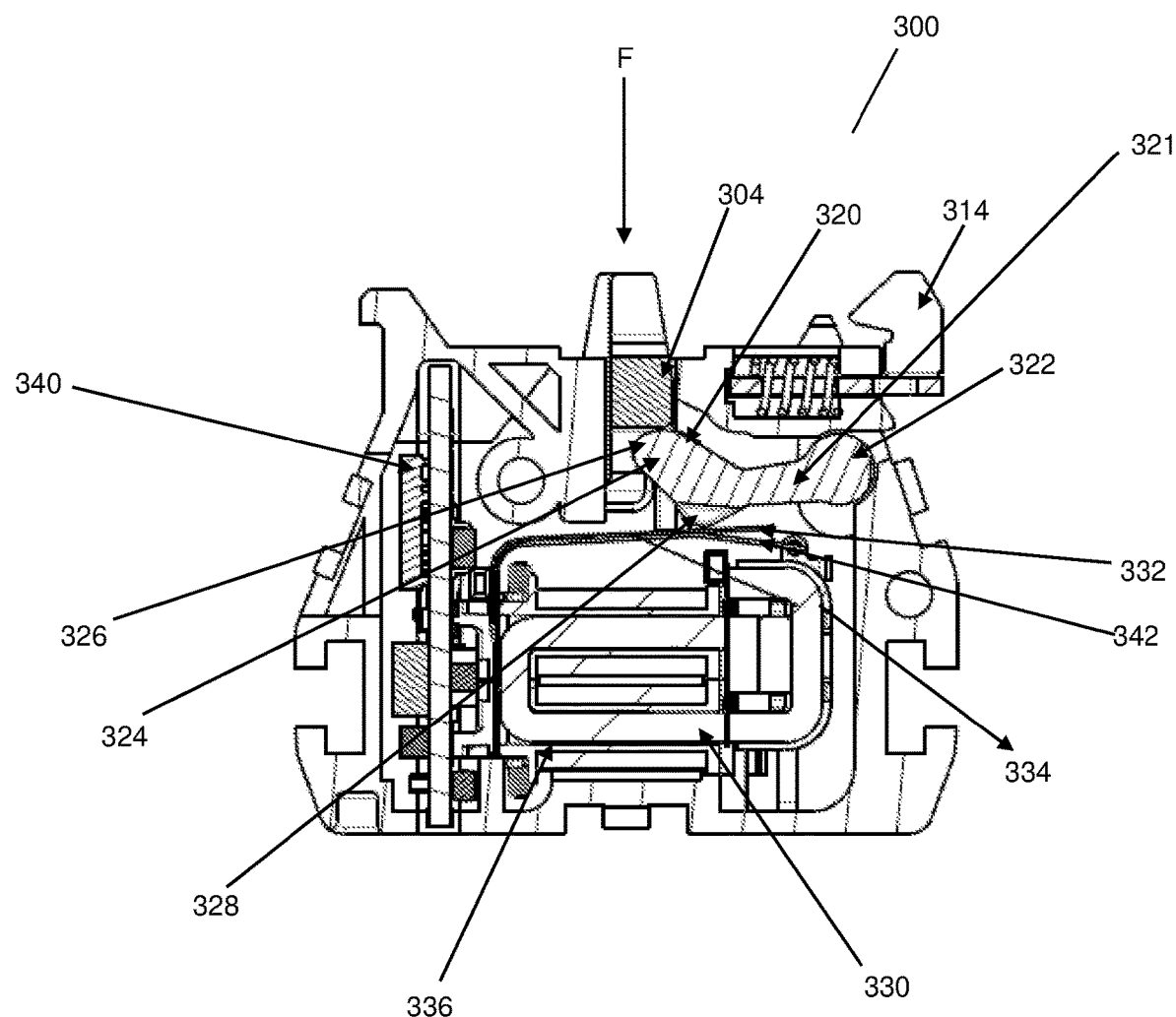
FIG. 3B is a schematic drawing for illustrating the respective positions of the various components of the wireless transmitter in an intermediate second position in the exemplary embodiment.
Figure 3C:
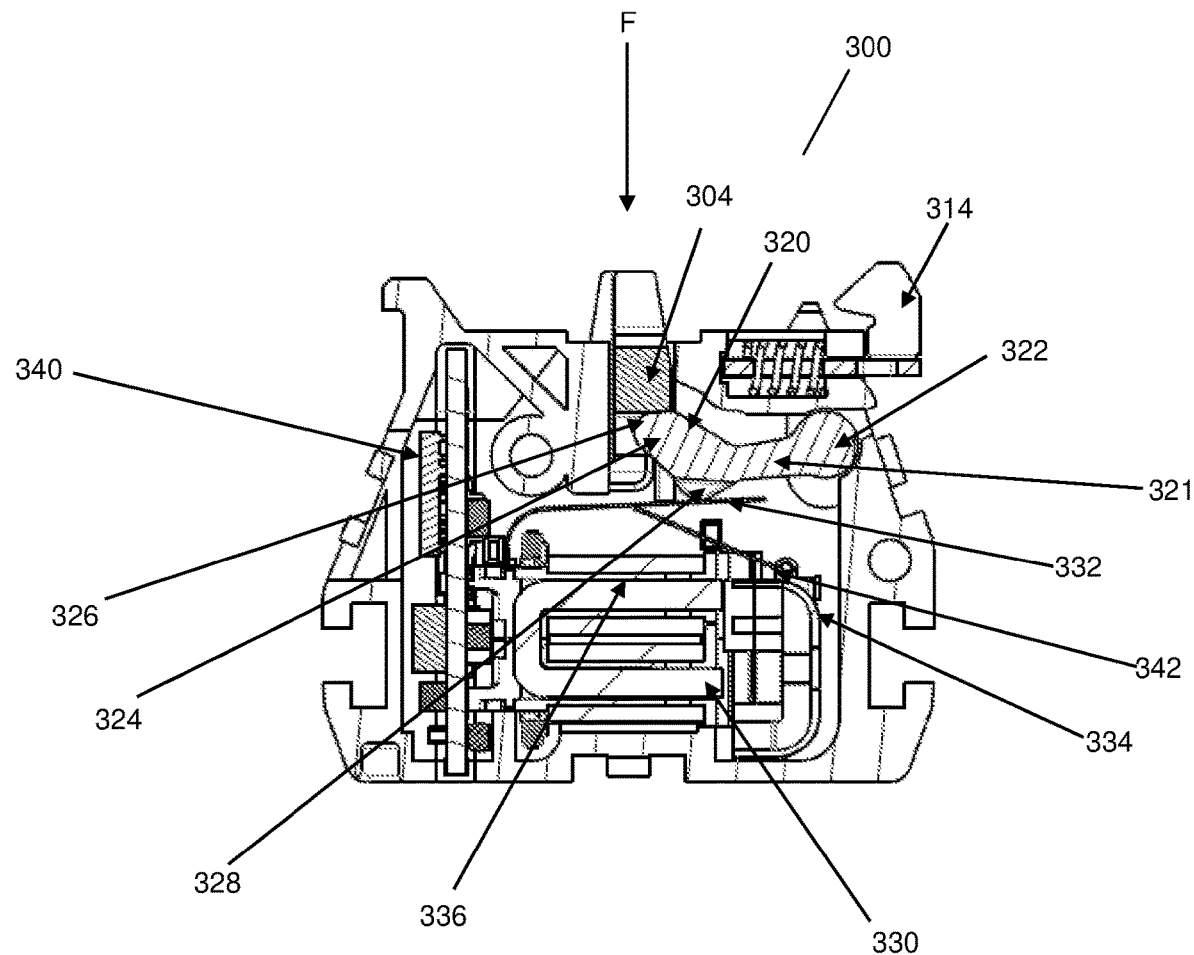
FIG. 3C is a schematic drawing for illustrating the respective positions of the various components of the wireless transmitter in a final third position in the exemplary embodiment.

FIG. 3A is a schematic drawing for illustrating the respective positions of the various components of a wireless transmitter in an initial first position in an exemplary embodiment. FIG. 3B is a schematic drawing for illustrating the respective positions of the various components of the wireless transmitter in an intermediate second position in the exemplary embodiment. FIG. 3C is a schematic drawing for illustrating the respective positions of the various components of the wireless transmitter in a final third position in the exemplary embodiment.

In this exemplary embodiment, the translational member 304 is in the form of a plunger but it will be appreciated that the translational member 304 is not limited as such.

In the exemplary embodiment, as shown in FIG. 3A, the various components of a wireless transmitter 300 are in an initial first position when no force is applied on a translational member 304 of the wireless transmitter 300. This state may also be termed as an unactuated state.

In the initial first position, the cam member 320 may be spaced apart from, or in minimal contact with, a spring 332 of a power generator 330 of the wireless transmitter 300. The power generator 330 is in a non-activated state.

An external mechanical force F may be applied to the translational member 304 to actuate or activate the wireless transmitter 300. For example, an external actuation device (not shown) can be mechanically engaged with a first mechanical mating member 314 of the wireless transmitter 300. The external actuation device may comprise a plunger/piston which is arranged to mechanically contact the translational member 304 of the wireless transmitter 300.

With the application of the external mechanical force F, as shown in FIG. 3B, the various components of the wireless transmitter 300 are shown in an intermediate second position, i.e. upon actuation of the wireless transmitter 300.

With reference to FIG. 3B, when an external mechanical force F is applied on the external actuation device (not shown), the piston of the external actuation device pushes the translational member 304 of the wireless transmitter 304. Therefore, the external mechanical force F causes the translational member 304 to translate downward in a substantially vertical direction towards the cam member 320. When the translational member 304 contacts a projecting end 326 of a contact component 324 of the cam member 320, the cam member 320 starts to rotate/pivot off-centre of a member body 321 of the cam member 320, the rotation about the fixed end 322 in a first direction. The first direction is in a downward direction and towards the spring 332 of the power generator 330. With reference to FIG. 3B, the first direction is an anti-clockwise direction. The cam member 320 is displaced in an increasing displacement in a downward direction during the rotation process in the first direction.

At a particular point during the rotation process of the cam member 320 in the first direction, a heel portion 328 of the contact component 324 of the cam member 320 starts to contact the spring 332 of the power generator 330. As the cam member 330 continues to rotate about the fixed end 322 in the first direction, the heel portion 328 contacts and pushes down on the spring 332. As the contact component 324 rotates in the first direction towards the power generator 330, an increasing surface area of the heel portion 328 contacts the spring 332 of the power generator 330 to increasingly displace the spring 332 in order to eventually generate the power to operate the wireless transmitter 300.

As shown in FIG. 3B, the spring 332 of the power generator 330 is compressed by the heel portion 328 of the cam member 330 pressing down on the spring 332. A magnet 334 of the power generator 330 is mechanically connected to the spring 332 via a lever 342. As the spring 332 is compressed, energy builds up in the spring 332. The magnet 334 remains in the same position in the initial first position and the intermediate second position due to the attraction force of the magnet 334.

With reference to FIG. 3C, when the spring 332 is displaced maximally due to the contact of the cam member 330, the force of the spring 332 becomes higher than the attraction force of the magnet 334. The spring 332 is straightened and the force of the spring 332 displaces the lever 342 that in turn causes the magnet 334 to translate in a downward direction, e.g. in an abrupt manner, towards the bottom part of the transmitter housing until the magnet 334 reaches a final third position as shown in FIG. 3C. Compare the position of the magnet 334 in FIGS. 3B and 3C. Thus, the magnet 334 moves with respect to a static electromagnetic coil 336 of the power generator 330. The movement of the magnet 334 induces a voltage and a current in the static electromagnetic coil 336 of the power generator 330.

At this stage, the power generator 330 is thereby activated with the actuation of the wireless transmitter 300 via the translational member 304. The activation/induction produces enough/sufficient energy/power to fulfil the functionality of the wireless transmitter 300. The wireless transmitter 300 is powered up and the power generator 300 provides power e.g. including providing power to a transmission mechanism disposed on a circuit board 340 in the wireless transmitter 300 for transmitting one or more communication signals to a corresponding receiver. For example, a microcontroller on the circuit board 340 may be activated with the generation of the power and a transmission of three radio frames may be transmitted to a receiver. The frequency of the one or more signals may be stored in a storage module of the circuit board 340.

In the exemplary embodiment, as shown in FIG. 3C, the various components of the wireless transmitter 300 are in the final third position. In the final third position, the magnet 334 of the power generator 330 is in the final position having moved down from the initial first and intermediate second position, and the power generator 330 is activated.

In the exemplary embodiment, when the mechanical force F is removed, the components return to the initial position as shown in FIG. 3A. For example, the spring 332 is biased back towards the initial first position shown in FIG. 3A. With the movement of the spring 332, the lever 342 pulls the magnet 334 from the final third position in an upward direction towards a first top surface of the transmitter housing. At a particular point, when the spring 332 is returned to the initial first position, the magnet 334 moves, e.g. in an abrupt manner, back to the initial first position as shown in FIG. 3A. The return of the spring 332 causes the cam member 320 to rotate/pivot off-centre of the member body 321 of the cam member 320 about the fixed end 322 in a second direction until the cam member 320 returns to the initial first position as shown in FIG. 3A. The second direction is in an upward direction and towards the translational member 304. With reference to FIG. 3B, the second direction is a clockwise direction. The translational member 304 is thereby moved back to the initial first position. No external force needs to be applied to move the components back to the initial first position of FIG. 3A from the final third position of FIG. 3C.

In the described exemplary embodiments, with the arrangement of the translational member (for example, compare translation member 204 of FIG. 2A) and the cam member (for example, compare cam member 220 of FIG. 2A), the translational member may be provided with a shorter length/height as compared to other such devices. With the cam member, the translational member may work with different travel distances of different actuators and therefore, the wireless transmitter of exemplary embodiments may work with different actuation devices. For example, the translational member may only travel a short distance to rotate the cam member that in turn increasingly displaces a generating mechanism of a power generator (for example, compare spring 232 of power generator 230 of FIG. 2A). The short distance is sufficient so long as the translation member can contact the cam member 220 which performs an off-centre rotation to increasingly displace the generating mechanism of the power generator, e.g. to toggle a magnet of the power generator 230. As such, different actuators with different travel distances may be accommodated to work with the translational member.

With the exemplary dimensions shown in FIG. 1B and FIG. 2B, the small form factor of the wireless transmitter of described exemplary embodiments allows the wireless transmitter to be mounted in different configurations to complement an existing wired system or as a standalone wireless contact block. For example, multiple wireless transmitters can be mounted together with or be mechanically coupled to a single external actuation device. As another example, the wireless transmitter can be mounted to or be mechanically coupled to a wired transmitter which is in turn coupled to a single external actuation device. For example, the wireless transmitter can be mounted with an adjacent wired transmitter, both coupled to an external actuation device.

Figure 4A:
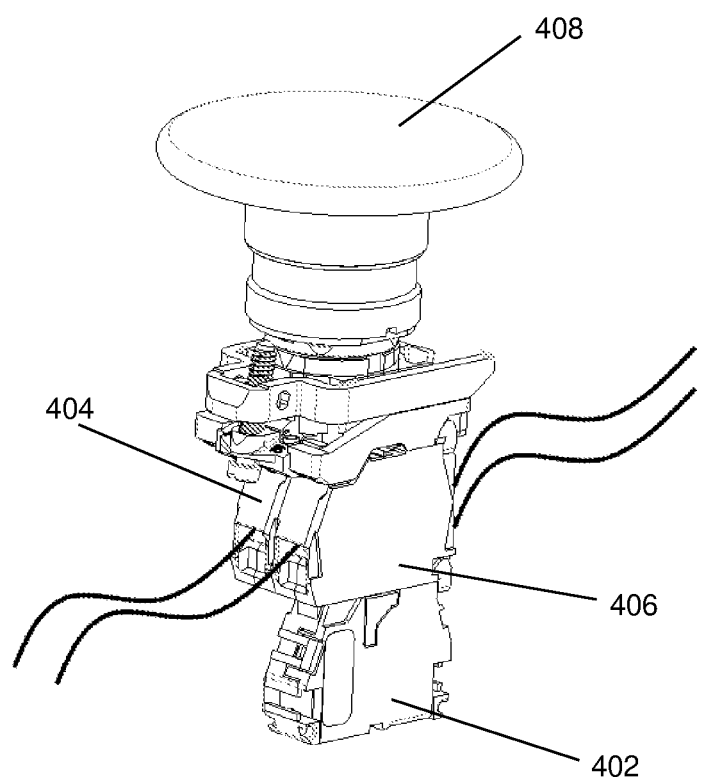
FIG. 4A is a schematic illustration of a wireless transmitter mounted to a wired block in an exemplary embodiment.

FIG. 4A is a schematic illustration of a wireless transmitter mounted to a wired block in an exemplary embodiment.

Due to the translational member and cam member arrangement of the wireless transmitter, the wireless transmitter may usefully work with an actuator of a wired contact block. That is, the wireless transmitter may work with actuators with different travel distances.

As shown in FIG. 4A, two wired contact blocks 404, 406 are coupled to an actuation device 408 in the form of a pushbutton. The wired contact blocks 404, 406 may be, but are not limited to, wired transmitters. A wireless transmitter 402 is mounted below one of the two wired contact blocks 404, 406. For example, the wireless transmitter 402 is shown mounted to the wired contact block 406. In this illustration, the external actuation device to the wireless transmitter 402 is the wired contact block 406. The actuation device 408 may be used to perform actuation, e.g. via an actuator (not shown) of the actuation device 408, on the two wired contact blocks 404, 406. As a result of the coupling of the wireless transmitter 402 to the wired contact block 406, the actuation from the actuation device 408 in turn actuates an actuator (not shown) of the wired contact block 406 to perform actuation of the wireless transmitter 402, i.e. at its translational member (not shown).

Figure 4B:
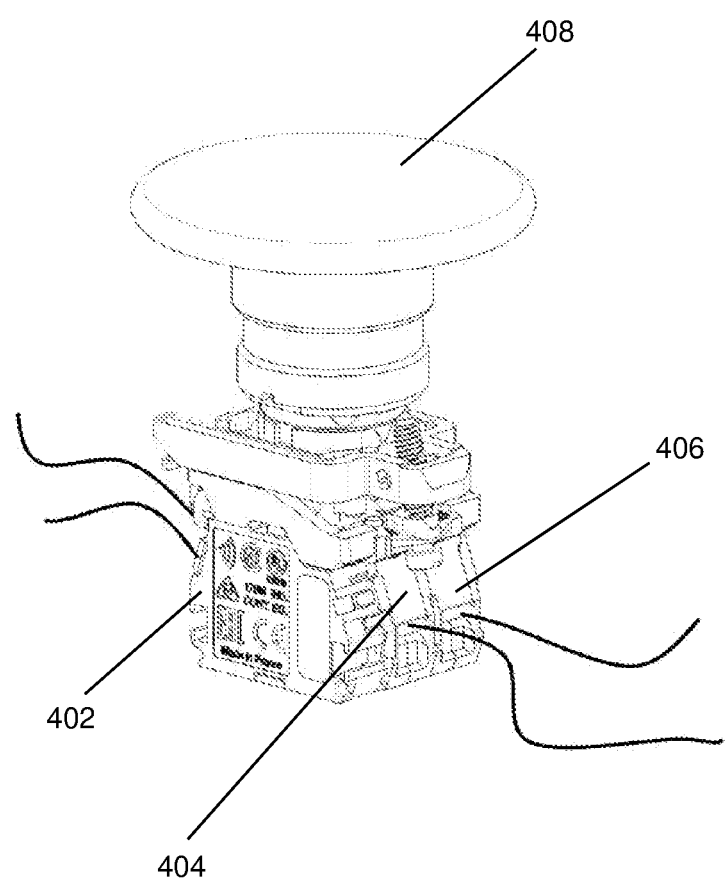
FIG. 4B is a schematic illustration of a wireless transmitter mounted adjacent to a wired block in an exemplary embodiment.

FIG. 4B is a schematic illustration of a wireless transmitter mounted adjacent to a wired block in an exemplary embodiment.

Due to the described arrangements of the wireless transmitter of the exemplary embodiments resulting in a small form factor, it becomes possible to fit the wireless transmitter to any existing actuation control devices and also leave sufficient space for other contact blocks. Such contact blocks may be other wireless transmitters, other similar or identical wireless transmitters of exemplary embodiments and/or wired contact blocks.

As shown in FIG. 4B, the two wired contact blocks 404, 406 are coupled to the actuation device 408 in the form of a pushbutton. The wired contact blocks 404, 406 may be, but are not limited to, wired transmitters. The wireless transmitter 402 is mounted to the actuation device 408 and adjacent to the two wired contact blocks 404, 406. In this illustration, the external actuation device to the wireless transmitter 402 is the actuation device 408. The actuation device 408 may be used to perform actuation, e.g. via an actuator (not shown) of the actuation device 408, on the wireless transmitter 402 and the two wired contact blocks 404, 406.

As a result of the possible mounting/coupling shown in FIGS. 4A and 4B, due to the small form factor and ability to work with different travel distances of actuators, it becomes possible to add functionalities and wireless communication to one or more receivers to the actuation device 408. For example, it becomes possible for the actuation device 408 to control devices/industrial units at one or more receivers communicating with the wireless transmitter 402.

Figure 5:
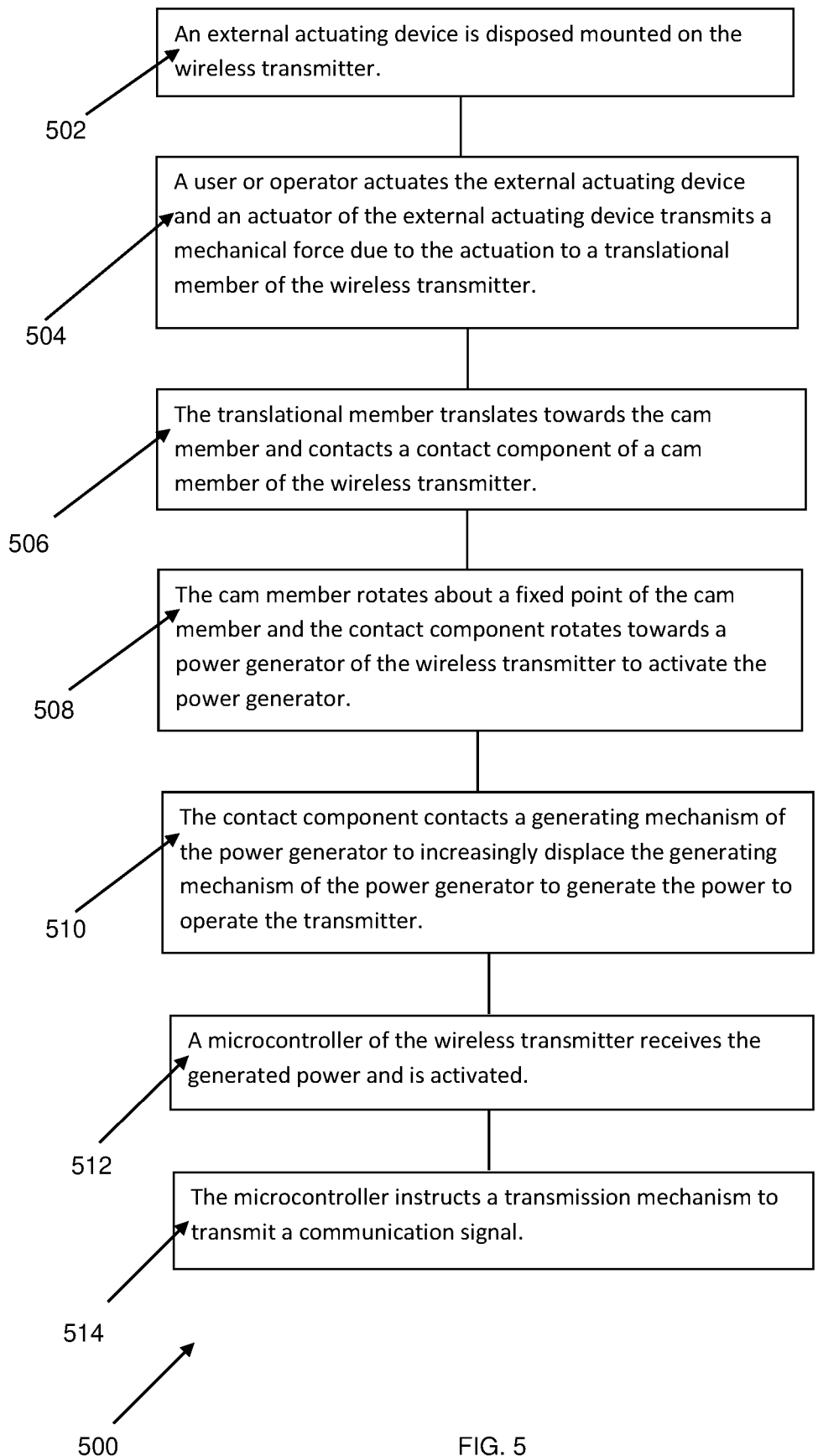
FIG. 5 is a schematic flowchart for illustrating a method of actuating a wireless transmitter in an exemplary embodiment.

FIG. 5 is a schematic flowchart 500 for illustrating a method of actuating a wireless transmitter in an exemplary embodiment. In the method, the wireless transmitter is a batteryless and wireless transmitter. The wireless transmitter is substantially similar to the wireless transmitter of other exemplary embodiments (for example, compare wireless transmitter 100, 200 of FIGS. 1A and 2A respectively).

At step 502, an external actuating device is disposed mounted on the wireless transmitter. At step 504, a user or operator actuates the external actuating device and an actuator of the external actuating device transmits a mechanical force due to the actuation to a translational member of the wireless transmitter. At step 506, the translational member translates towards the cam member and contacts a contact component of a cam member of the wireless transmitter. At step 508, the cam member rotates about a fixed point of the cam member and the contact component rotates towards a power generator of the wireless transmitter to activate the power generator. At step 510, the contact component contacts a generating mechanism of the power generator to increasingly displace the generating mechanism of the power generator to generate the power to operate the transmitter. At step 512, a microcontroller of the wireless transmitter receives the generated power and is activated. At step 514, the microcontroller instructs a transmission mechanism to transmit a communication signal.

In the exemplary embodiment, the transmission may be based on a predetermined frequency stored in and retrieved from a storage module of the wireless transmitter. The contents of the transmission may be instructed by the microcontroller and/or be stored in and retrieved from the storage module of the wireless transmitter.

Figure 6:
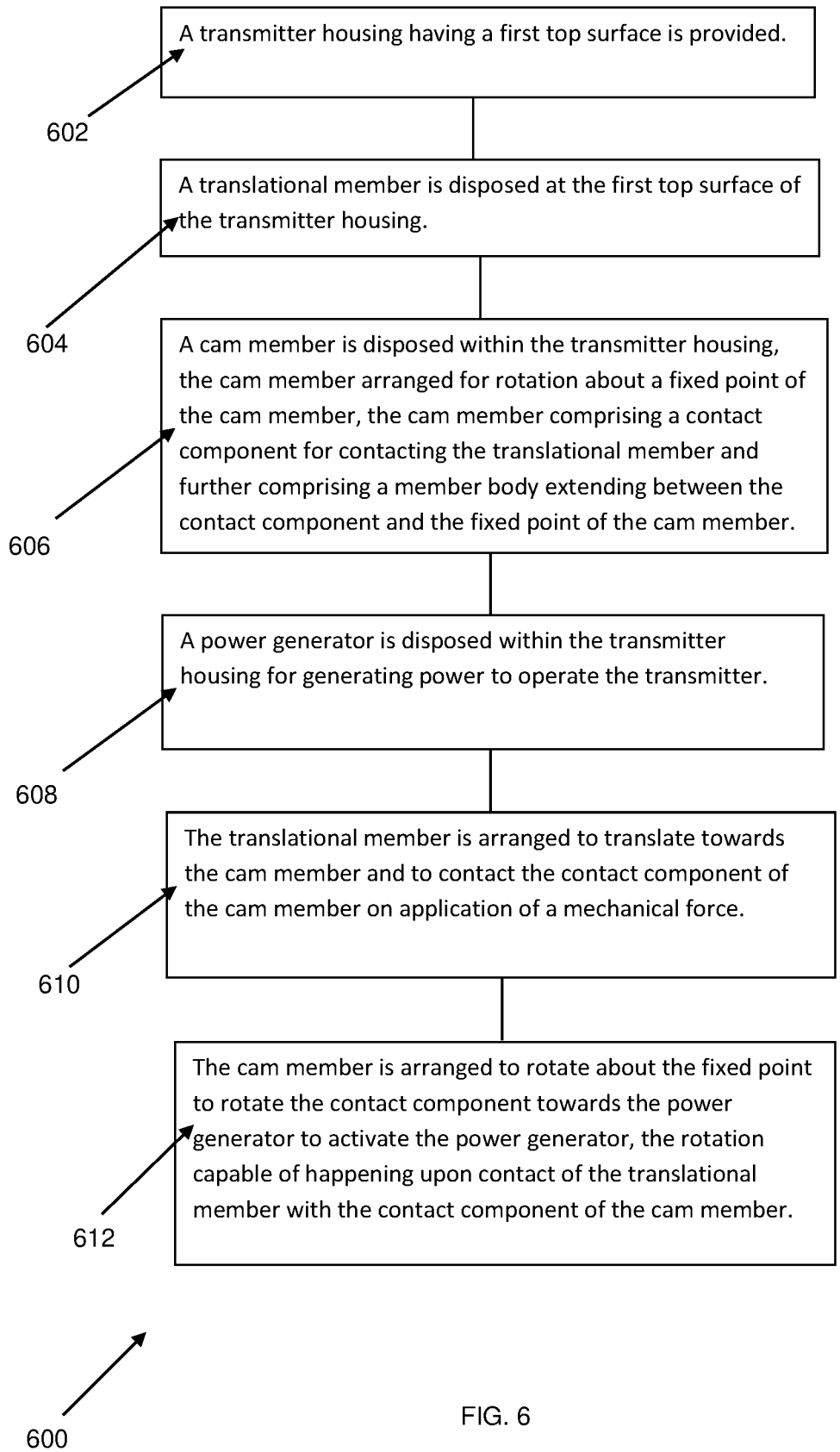
FIG. 6 is a schematic flowchart for illustrating a method of producing a wireless transmitter in an exemplary embodiment.

FIG. 6 is a schematic flowchart 600 for illustrating a method of producing a wireless transmitter in an exemplary embodiment.

At step 602, a transmitter housing having a first top surface is provided. At step 604, a translational member is disposed at the first top surface of the transmitter housing. At step 606, a cam member is disposed within the transmitter housing, the cam member arranged for rotation about a fixed point of the cam member, the cam member comprising a contact component for contacting the translational member and further comprising a member body extending between the contact component and the fixed point of the cam member. At step 608, a power generator is disposed within the transmitter housing for generating power to operate the transmitter. At step 610, the translational member is arranged to translate towards the cam member and to contact the contact component of the cam member on application of a mechanical force. At step 612, the cam member is arranged to rotate about the fixed point to rotate the contact component towards the power generator to activate the power generator, the rotation capable of happening upon contact of the translational member with the contact component of the cam member.

In the exemplary embodiment, the contact component of the cam member may comprise a projecting end angled towards the translational member for contacting the translational member and a heel portion distal to the projecting end of the cam member. The method may further comprise arranging the heel portion to be displaced towards a generating mechanism of the power generator.

In the exemplary embodiment, the method may further comprise arranging the cam member such that upon the contact component rotating towards the power generator, an increasing surface area of the heel portion is capable of contacting the generating mechanism of the power generator to increasingly displace the generating mechanism of the power generator to generate the power to operate the transmitter.

In the exemplary embodiment, the method may further comprise disposing at least one electrically conductive member on at least one side wall of the housing, the at least one electrically conductive member arranged to allow electrical coupling to another device disposed adjacent to the wireless transmitter.

In the exemplary embodiment, the method may further comprise disposing a transmission mechanism on a circuit board, and disposing the circuit board in a vertical orientation extending between the first top surface and an opposing second bottom surface of the housing.

In the exemplary embodiment, the transmission mechanism may be capable of transmitting a communication signal upon generation of power by the power generator.

In the exemplary embodiment, the method may further comprise disposing a first mechanical mating member at the first top surface and adapting the first mechanical mating member to mechanically engage with an external actuation device disposed at the first top surface.

In the exemplary embodiment, the method may further comprise disposing a second mechanical mating member at a back end of the housing and adapting the second mechanical mating member to mechanically couple with an external device disposed adjacent to the wireless transmitter.

The above described exemplary embodiments may provide a batteryless and wireless transmitter. The wireless transmitter may be modular in form. The wireless transmitter may be actuated by a main control unit and may be used to send a radio signal to a receiver/receptor. The wireless transmitter of described exemplary embodiments may be a self-powered contact block which can be connected to a wide range of industrial control devices and for industrial units.

In the described exemplary embodiments, a plunger and pivot type of arrangement is adopted, in the form of a translational member and a cam member, in the wireless, batteryless transmitter. The cam arrangement/system allows the wireless, batteryless transmitter to work with external actuation devices with different travel distances in the respective actuating mechanisms of the external actuation devices. Therefore, the wireless, batteryless transmitter of the described exemplary embodiments is not limited to work/operate with a specific type of external actuation device. The wireless transmitter of the exemplary embodiments with the cam arrangement/system may work with and accommodate different varieties of external actuation devices with different travelling/translational distances of their respective actuators/plungers. Therefore, there is no need to provide a specific type of external actuation device for working/operating with the wireless transmitter.

Further, it becomes possible for the wireless transmitter of the described exemplary embodiments to be coupled to a wired transmitter that is in turn coupled to an actuation device. Due to the wireless transmitter of the exemplary embodiments being able to work with different travel distances of actuators, a wired transmitter may consequently be able to actuate the wireless transmitter of the exemplary embodiments.

The inventors recognise that, currently, a wired transmitter cannot be coupled to a wireless transmitter. With the cam arrangement/system, the wireless transmitter may usefully couple or connect to a wired transmitter to add new functionalities to a device/machinery. For example, the external actuation device, e.g. a pushbutton, already coupled to the wired transmitter can be expanded to control new systems/devices at new receivers communicating with the wireless transmitter of the exemplary embodiments. In this regard, multiple functions may be fulfilled with a single external actuation device. For example, the external actuation device may control the on/off states of a machinery by wired communication and at the same time, send a wireless communication signal via the wireless transmitter to a corresponding receiver which may collect information on the on/off cycles. For example, other new functions may be added such as information collection relating to monitoring of statuses and/or data collection at a device/machinery.

Further, the inventors recognise that, currently, only a single wireless transmitter can be coupled to an external actuation device, i.e. one-to-one coupling. With the plunger and pivot arrangement, i.e. the cam arrangement/system, the translational distance for the translational member to activate the power generator is minimized and reduced. The length of the translational member is therefore also minimized and reduced. The height of the wireless, batteryless transmitter of the exemplary embodiments may be made much smaller leading to significantly small form factor or significantly smaller wireless transmitters. A small power generator which is used together with the plunger and pivot arrangement may also contribute to the small form factor. As such, with the achieved small form factor for the wireless transmitter, it becomes possible for more than one wireless transmitter to be coupled to an external actuation device, i.e. the wireless transmitter of the exemplary embodiments becomes modular in nature.

In the described exemplary embodiments, an all-in-one communication module with a microcontroller and a transmission mechanism including an antenna and communication tuning components disposed on a circuit board is used in the wireless transmitter. The use of an all-in-one communication module may fulfil both the role of controlling the circuitry and sending the communication signals. This may result in a compact wireless transmitter as all the functions are integrated in a single microchip.

In the described exemplary embodiments, the circuit board is placed in a vertical orientation in the wireless transmitter. The vertical orientation of the circuit board allows optimization of the space. The antenna of the circuit board is also located nearer to top of the wireless transmitter. This allows a stronger communication signal to be sent by the wireless transmitters to the respective receivers. In addition, with the vertical orientation, the optimisation of space also contributes to the small form factor of the wireless transmitter.

In the described exemplary embodiments, the electrically conductive member disposed on at least one side wall of the transmitter housing provides a connection interface for an external device disposed adjacent to the wireless transmitter. This electrically conductive member may avoid the need to provide a relatively large electrical conductor/input module on the circuit board or on the surface of the wireless transmitter, and therefore allowing another device to be disposed directly adjacent to the wireless transmitter.

The terms "coupled" or "connected" as used in this description are intended to cover both directly connected or connected through one or more intermediate means, unless otherwise stated.

The terms "configured to (perform a task/action)", "configured for (performing a task/action)" and the like as used in this description include being programmable, programmed, connectable, wired or otherwise constructed to have the ability to perform the task/action when arranged or installed as described herein. The terms "configured to (perform a task/action)", "configured for (performing a task/action)" and the like are intended to cover "when in use, the task/action is performed", e.g. specifically to and/or specifically configured to and/or specifically arranged to and/or specifically adapted to do or perform a task/action.

The term "and/or", e.g., "X and/or Y" is understood to mean either "X and Y" or "X or Y" and should be taken to provide explicit support for both meanings or for either meaning.

The terms "associated with", "related to" and the like used herein when referring to two elements refers to a broad relationship between the two elements. The relationship includes, but is not limited to, a physical, a chemical or a biological relationship. For example, when element A is associated with element B, elements A and B may be directly or indirectly attached to each other or element A may contain element B or vice versa.

The terms "exemplary embodiment", "example embodiment", "exemplary implementation", "exemplarily" and the like used herein are intended to indicate an example of matters described in the present disclosure. Such an example may relate to one or more features defined in the claims and is not necessarily intended to emphasise a best example or any essentialness of any features.

Further, unless specifically stated otherwise, and would ordinarily be apparent from the following, a person skilled in the art will appreciate that throughout the present specification, discussions utilizing terms such as "scanning", "calculating", "determining", "replacing", "generating", "initializing", "outputting", and the like, refer to action and processes of an instructing processor/computer system, or similar electronic circuit/device/component, that manipulates/processes and transforms data represented as physical quantities within the described system into other data similarly represented as physical quantities within the system or other information storage, transmission or display devices etc.

Further, in the description herein, the word "substantially" whenever used is understood to include, but not restricted to, "entirely" or "completely" and the like. In addition, terms such as "comprising", "comprise", and the like whenever used, are intended to be non-restricting descriptive language in that they broadly include elements/components recited after such terms, in addition to other components not explicitly recited. For an example, when "comprising" is used, reference to a "one" feature is also intended to be a reference to "at least one" of that feature. Terms such as "consisting", "consist", and the like, may, in the appropriate context, be considered as a subset of terms such as "comprising", "comprise", and the like. Therefore, in embodiments disclosed herein using the terms such as "comprising", "comprise", and the like, it will be appreciated that these embodiments provide teaching for corresponding embodiments using terms such as "consisting", "consist", and the like. Further, terms such as "about", "approximately" and the like whenever used, typically means a reasonable variation, for example a variation of +/−5% of the disclosed value, or a variance of 4% of the disclosed value, or a variance of 3% of the disclosed value, a variance of 2% of the disclosed value or a variance of 1% of the disclosed value.

Furthermore, in the description herein, certain values may be disclosed in a range. The values showing the end points of a range are intended to illustrate a preferred range. Whenever a range has been described, it is intended that the range covers and teaches all possible sub-ranges as well as individual numerical values within that range. That is, the end points of a range should not be interpreted as inflexible limitations. For example, a description of a range of 1% to 5% is intended to have specifically disclosed sub-ranges 1% to 2%, 1% to 3%, 1% to 4%, 2% to 3% etc., as well as individually, values within that range such as 1%, 2%, 3%, 4% and 5%. It is to be appreciated that the individual numerical values within the range also include integers, fractions and decimals. Furthermore, whenever a range has been described, it is also intended that the range covers and teaches values of up to 2 additional decimal places or significant figures (where appropriate) from the shown numerical end points. For example, a description of a range of 1% to 5% is intended to have specifically disclosed the ranges 1.00% to 5.00% and also 1.0% to 5.0% and all their intermediate values (such as 1.01%, 1.02% . . . 4.98%, 4.99%, 5.00% and 1.1%, 1.2% . . . 4.8%, 4.9%, 5.0% etc.,) spanning the ranges. The intention of the above specific disclosure is applicable to any depth/breadth of a range.

As described in the exemplary embodiments, the external actuation device is not limited to a pushbutton, a selector switch or a joystick. The external actuation device may be a wired transmitter that has an actuator or a plunger capable of actuating the wireless transmitter. For example, the wired transmitter may have a plunger that goes through the full length of the wired transmitter, which can provide a mechanical contact to the translational member of the wireless transmitter, when the wireless transmitter is mounted/placed below the wired transmitter.

In the described exemplary embodiments, the electrically conductive member is in the form of a gold plated edge, one or more contact pads or one or more pogo pins. However, it is to be appreciated that the exemplary embodiments are not limited as such. The electrically conductive member may be in any form so long as it may electrically couple the wireless transmitter to another device disposed directly adjacent to the wireless transmitter.

Next, it is to be appreciated that the power generator of the wireless transmitter of the exemplary embodiments is not limited to the form described in the exemplary embodiments. For example, the power generator may include, or alternatively be, a magnetic induction type generator, a piezoelectric type generator etc.

Further, it is to be appreciated that the cam member of the wireless transmitter is not limited to the shape as shown in the figures of the drawings. The cam member may be in the form of any shape so long as the functionalities as described for the components of the cam member may be achieved.

It will be appreciated by a person skilled in the art that other variations and/or modifications may be made to the specific embodiments without departing from the scope of the claimed invention as broadly described. For example, in the description herein, features of different exemplary embodiments may be mixed, combined, interchanged, incorporated, adopted, modified, included etc. or the like across different exemplary embodiments. For example, exemplary embodiments are not necessarily mutually exclusive as some may be combined with one or more embodiments to form new exemplary embodiments. Furthermore, it will be appreciated that while the present disclosure provides embodiments having one or more of the features/characteristics discussed herein, one or more of these features/characteristics may also be disclaimed in other alternative embodiments and the present disclosure provides support for such disclaimers and these associated alternative embodiments. The present embodiments are, therefore, to be considered in all respects to be illustrative and not restrictive.

What is claimed is:

1. A wireless transmitter for coupling to an actuation device, the transmitter comprising,
   a transmitter housing having a first top surface;
   a translational member located at the first top surface of the transmitter housing;
   a cam member located within the transmitter housing, the cam member arranged for rotation about a fixed point of the cam member, the cam member comprising a contact component for contacting the translational member,
   the cam member further comprising a member body extending between the contact component and the fixed point of the cam member;
   a power generator located within the transmitter housing for generating power to operate the transmitter;
   wherein the translational member is arranged to translate in a downward direction with respect to the first top surface towards the cam member and to contact the contact component of the cam member on application of a mechanical force; and wherein the cam member is arranged to rotate about the fixed point and in a downward direction with respect to the first top surface such that the contact component is capable of rotating towards the power generator to activate the power generator, the rotating being upon contact of the translational member with the contact component of the cam member.

2. The wireless transmitter as claimed in claim 1, wherein the contact component of the cam member comprises a projecting end angled towards the translational member for contacting the translational member and a heel portion distal to the projecting end of the cam member, the heel portion being arranged to be displaced towards a generating mechanism of the power generator.

3. The wireless transmitter as claimed in claim 2, wherein upon the contact component rotating towards the power generator, an increasing surface area of the heel portion contacts the generating mechanism of the power generator to increasingly displace the generating mechanism of the power generator to generate the power to operate the transmitter.

4. The wireless transmitter as claimed in claim 1 further comprising at least one electrically conductive member disposed on at least one side wall of the housing, the at least one electrically conductive member arranged to allow electrical coupling to another device disposed adjacent to the wireless transmitter.

5. The wireless transmitter as claimed in claim 1 further comprising a transmission mechanism disposed on a circuit board, the circuit board disposed in a vertical orientation extending between the first top surface and an opposing second bottom surface of the housing.

6. The wireless transmitter as claimed in claim 5, wherein the transmission mechanism is capable of transmitting a communication signal upon generation of power by the power generator.

7. The wireless transmitter as claimed in claim 1 further comprising a first mechanical mating member disposed at the first top surface wherein the first mechanical mating member is adapted to mechanically engage with an external actuation device disposed at the first top surface.

8. The wireless transmitter as claimed in claim 1 further comprising a second mechanical mating member disposed at a back end of the housing wherein the second mechanical mating member is adapted to mechanically couple with an external device disposed adjacent to the wireless transmitter.

9. The wireless transmitter as claimed in claim 8 wherein the second mechanical mating member is in the form of a thoroughfare extending from the one side wall of the housing to an opposing side wall of the housing to mate with a complementary member of the another device.

10. A method of producing a wireless transmitter, the method comprising,
providing a transmitter housing having a first top surface;
disposing a translational member at the first top surface of the transmitter housing;
disposing a cam member within the transmitter housing, the cam member arranged for rotation about a fixed point of the cam member, the cam member comprising a contact component for contacting the translational member, the cam member further comprising a member body extending between the contact component and the fixed point of the cam member;
disposing a power generator within the transmitter housing for generating power to operate the transmitter;
further arranging the translational member to translate in a downward direction with respect to the first top surface towards the cam member and to contact the contact component of the cam member on application of a mechanical force; and further arranging the cam member to rotate about the fixed point and in a downward direction with respect to the first top surface to rotate the contact component towards the power generator to activate the power generator, the rotation capable of happening upon contact of the translational member with the contact component of the cam member.

11. The method as claimed in claim 10, wherein the contact component of the cam member comprises a projecting end angled towards the translational member for contacting the translational member and a heel portion distal to the projecting end of the cam member, the method further comprising arranging the heel portion to be displaced towards a generating mechanism of the power generator.

12. The method as claimed in claim 11, the method further comprising arranging the cam member such that upon the contact component rotating towards the power generator, an increasing surface area of the heel portion is capable of contacting the generating mechanism of the power generator to increasingly displace the generating mechanism of the power generator to generate the power to operate the transmitter.

13. The method as claimed in claim 10, the method further comprising disposing at least one electrically conductive member on at least one side wall of the housing, the at least one electrically conductive member arranged to allow electrical coupling to another device disposed adjacent to the wireless transmitter.

14. The method as claimed in claim 10, the method further comprising disposing a transmission mechanism on a circuit board, and disposing the circuit board in a vertical orientation extending between the first top surface and an opposing second bottom surface of the housing.

15. The method as claimed in claim 14, wherein the transmission mechanism is capable of transmitting a communication signal upon generation of power by the power generator.

16. The method as claimed in claim 10, the method further comprising disposing a first mechanical mating member at the first top surface and adapting the first mechanical mating member to mechanically engage with an external actuation device disposed at the first top surface.

17. The method as claimed in claim 10, the method further comprising disposing a second mechanical mating member at a back end of the housing and adapting the second mechanical mating member to mechanically couple with an external device disposed adjacent to the wireless transmitter.

18. The method as claimed in claim 17 wherein the second mechanical mating member is in the form of a thoroughfare extending from the one side wall of the housing to an opposing side wall of the housing to mate with a complementary member of the another device.

* * * * *